(No Model.)
J. BROWN.
SIRUP FOUNTAIN.
No. 317,618. Patented May 12, 1885.
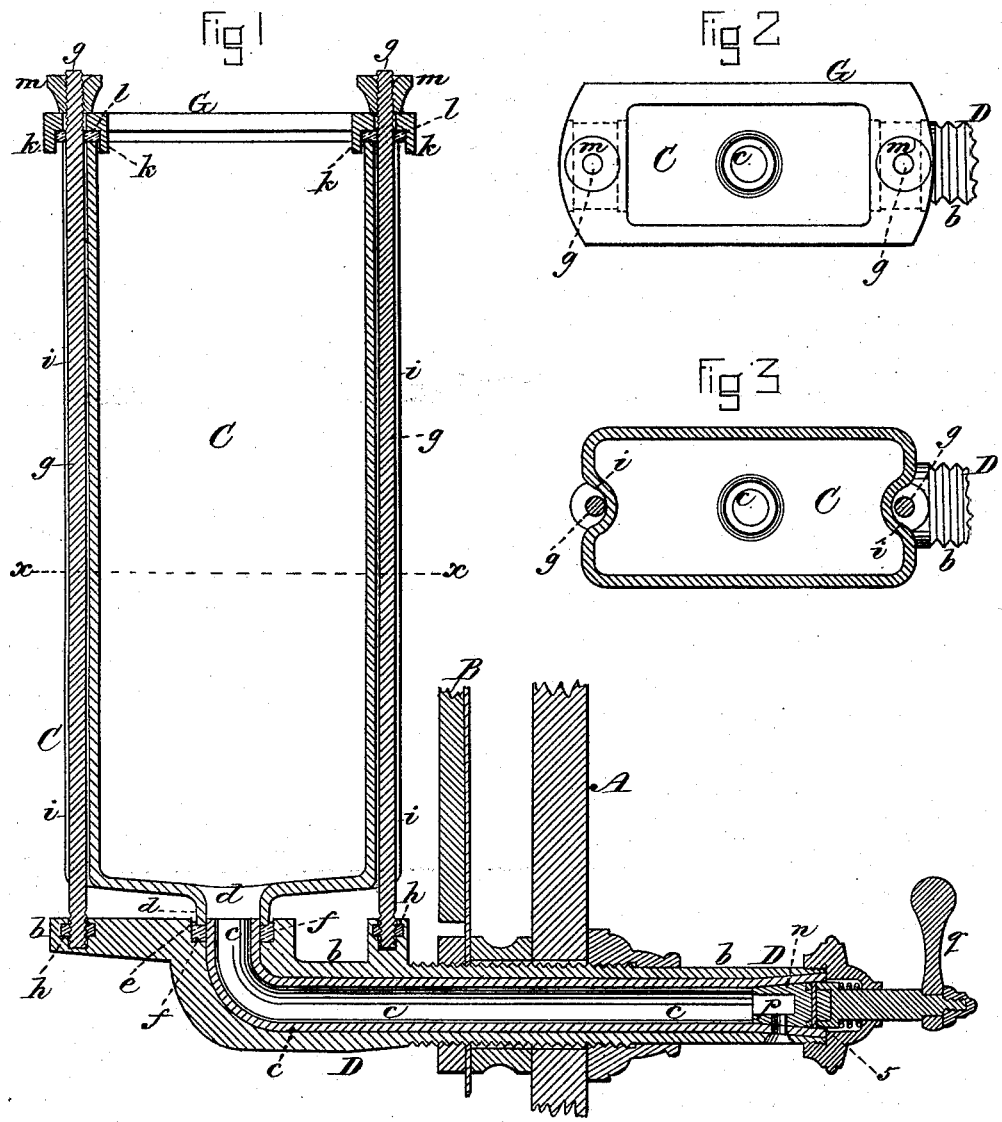
Witnesses
W. J. Cambridge
James C. Libby
Inventor
John Brown

UNITED STATES PATENT OFFICE.

JOHN BROWN, OF MEDFORD, MASSACHUSETTS, ASSIGNOR TO JAMES W. TUFTS, OF SAME PLACE.

SIRUP-FOUNTAIN.

SPECIFICATION forming part of Letters Patent No. 317,618, dated May 12, 1885.

Application filed August 18, 1884. (No model.)

*To all whom it may concern:*

Be it known that I, JOHN BROWN, a citizen of the United States, residing at Medford, in the county of Middlesex and State of Massachusetts, have invented certain Improvements in Glass Sirup Cans and Gates for Soda-Water-Dispensing Apparatus, of which the following is a full, clear, and exact description, reference being had to the accompanying drawings, making part of this specification, in which—

Figure 1 is a vertical section through the center of a sirup-can and its gate or delivery-pipe constructed in accordance with my invention. Fig. 2 is a plan of the top of the sirup-can. Fig. 3 is a transverse section on the line $x\ x$ of Fig. 1.

My invention relates to certain improvements in apparatus for dispensing soda-water; and it consists in a glass sirup can or receptacle provided with a gate or outlet-pipe lined throughout with glass and connected to the said can without the employment of metallic couplings or rubber connecting-tubes, whereby an uninterrupted surface of glass is provided from the top of the can to the outlet-aperture at the end of the gate, thus avoiding all contact of the contents of the can with metal or rubber, and the danger of corrosion or unpleasant taste resulting therefrom.

My invention also consists in a glass sirup can or receptacle provided with vertical grooves or corrugations in its sides, for the reception of rods adapted to support the can in position within the casing of the apparatus, the said rods, in connection with a cap-piece fitting over the top of the can and suitable thumb-nuts, forming a simple, strong, and convenient device for securely holding each can independently of the others, and allowing of its being readily removed and replaced when required.

My invention also consists in certain details of construction, as hereinafter set forth and specifically claimed.

In the said drawings, A is a portion of the front of the marble or outer casing of the apparatus, and B the lining thereof.

C represents one of the sirup cans or receptacles, which is composed wholly of glass, a series of these cans being arranged side by side in close proximity with the front of the apparatus in a well-known manner. Each can C is provided with a gate or outlet-pipe, D, composed of a block-tin shell or casing, $b$, within which is fitted a glass tube or lining, $c$, extending from the front to the rear end, at which latter point it is curved upward and adapted to fit within the neck or nipple $d$, which forms the outlet at the lower end of the glass can C. The metallic shell $b$ is provided around the upturned end of the glass tube $c$ with an annular chamber, $e$, for the reception of a rubber washer or packing-ring, $f$, upon which rests and is tightly pressed the lower end of the neck $d$ of the can C, whereby a tight joint is produced and leakage prevented, while as the end of the glass tube $c$ fits snugly within the neck $d$ there can be no contact of the sirup with the rubber packing $f$, and consequently no unpleasant taste or smell can be imparted to the sirup, as has heretofore occurred where rubber connections have been employed. The can C is supported vertically in position within the apparatus upon its gate D, and securely confined to the latter by means of two vertical rods, $g$, the lower ends of which are screwed into nuts $h$, embedded in the metallic shell $b$. These rods extend up through vertical grooves or corrugations $i$, formed in opposite sides of the glass sirup-can C, and through apertures in a metallic cap, G, which fits over the top of the can, and is provided at each end with a pair of flanges, $k\ k$, between which is placed a piece of rubber, $l$, which rests on the edge of the glass and serves to prevent the can from being broken when the cap G is forced down by means of the thumb-nuts $m$, which are screwed over the threaded upper ends of the rods $g$, and thus, as the cap G is pressed down onto the can by means of the nuts $m$, the neck $d$, at the lower end of the can, is forced tightly onto the rubber washer $f$, and brought directly into contact with the upturned end of the glass tube or lining $c$ of the gate D, and the parts held firmly and securely together in this position as required, the can C always remaining straight and even. Each can is thus supported independently of the others by means of the rods $g$ and grooves $i$ with the cap and nuts, a simple, strong, and reliable device being thus provided, which will permit of the can being readily removed and replaced, when desired. At the front end the glass tube c is made flaring, as seen at 5, Fig. 1, and within this flaring portion is fitted the plug n of the gate, which is preferably composed of hard rubber, on account of its cleanliness and smooth action in contact with a glass surface; but it may be made of wood, if desired. The plug n is provided with the usual outlet-aperture, p, and is operated by means of the handle q in the usual manner.

From the foregoing it will be seen that all metallic couplings and rubber connections are avoided, and a continuous or uninterrupted glass surface is provided, extending from the top of the sirup-can to the outlet-aperture p of the gate or delivery-pipe, and consequently all possibility of the contents of the sirup-can becoming contaminated and rendered dangerous to health by contact with metal or rubber is entirely avoided, while, as there are no sharp angles in the tube c, and no spaces or crevices for the collection of sirup, it can be easily kept clean and free from obstructions.

What I claim as my invention, and desire to secure by Letters Patent, is—

1. In a soda-water apparatus, the combination, with a glass sirup-can, of a metal gate or outlet-pipe provided with a continuous glass tube or lining extending without break or interruption from the can to the outlet, and having its inner end in direct contact with the nozzle or outlet-aperture of the can, while its outer end is made flaring to receive a plug, substantially as and for the purpose described.

2. In a soda-water apparatus, a glass sirup can or receptacle provided on its sides with vertical grooves or corrugations extending from top to bottom for the reception of supporting-rods, substantially as and for the purpose described.

3. In a soda-water apparatus, the combination, with a glass sirup-can provided on its sides with vertical grooves or corrugations extending from top to bottom, of supporting-rods passing through said grooves, a cap resting on the top of the can and fitting over the ends of the rods, and thumb-nuts applied to said rods over the cap, substantially as and for the purpose set forth.

4. In a soda-water apparatus, the combination of the glass sirup-can C, provided on its sides and throughout the length of the can with vertical grooves or corrugations $i$, the gate or outlet-pipe D, having a continuous glass tube or lining, $c$, in direct contact at its inner end with the nozzle or outlet-aperture $d$ of the can, the washer $f$, surrounding the end of the tube $c$, the rods $g$, attached at their lower ends to the gate D and extending up therefrom through the grooves $i$ of the can, the cap G, and the thumb-nuts $m$, all constructed to operate substantially in the manner and for the purpose set forth.

Witness my hand this 12th day of August, A. D. 1884.

JOHN BROWN.

In presence of—
P. E. TESCHEMACHER,
W. J. CAMBRIDGE.